(12) United States Patent
Barber et al.

(10) Patent No.: US 12,458,926 B2
(45) Date of Patent: *Nov. 4, 2025

(54) ELECTRODIALYSIS STACK

(71) Applicant: BL TECHNOLOGIES, INC., Minnetonka, MN (US)

(72) Inventors: John H. Barber, Guelph (CA); Wojciech Gutowski, Guelph (CA); Yongchang Zheng, Westborough, MA (US); Russell James MacDonald, Westborough, MA (US)

(73) Assignee: BL TECHNOLOGIES, INC., Minnetonka, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/408,133

(22) Filed: Jan. 9, 2024

(65) Prior Publication Data

US 2024/0139684 A1 May 2, 2024

Related U.S. Application Data

(62) Division of application No. 17/955,445, filed on Sep. 28, 2022, now Pat. No. 11,904,278, which is a
(Continued)

(51) Int. Cl.
*B01D 61/50* (2006.01)
*B01D 63/08* (2006.01)

(52) U.S. Cl.
CPC ........... *B01D 61/50* (2013.01); *B01D 63/085* (2013.01); *B01D 2313/14* (2013.01); *B01D 2325/42* (2013.01)

(58) Field of Classification Search
None
See application file for complete search history.

(56) References Cited

U.S. PATENT DOCUMENTS 3,068,166 A 12/1962 Felix et al.
3,149,062 A 9/1964 Jan et al.
(Continued)

FOREIGN PATENT DOCUMENTS

CN 1204549 A 1/1999
CN 103443035 A 12/2013
(Continued)

OTHER PUBLICATIONS

Chinese Patent Application No. 201780092873.1, Office Action dated Jan. 11, 2022.
(Continued)

*Primary Examiner* — Krishnan S Menon

(57) ABSTRACT

The present disclosure provides an electrodialysis stack that may be used for the treatment of an electrically conductive solution. The stack includes two electrodes (at least one is a recessed electrode), a plurality of ion-transport membranes and stack spacers. The membranes and spacers are arranged between the electrodes to define electrodialysis cell pairs. The stack includes an electrically insulated zone that extends substantially from a distribution manifold past the recessed edge of the electrode and substantially from the recessed electrode to the opposite electrode for a distance that is about 8% to 100% of the total distance between the electrodes. The overlap distance that the electrically insulated zone extends past the recessed edge of the electrode is calculated as:

distance in cm=$(0.062\ cm^{-1})*(exp(-60/total\ cp))*$ (area in $cm^2$ of the manifold ducts of the concentrated stream at the recessed edge)+/-10%.

16 Claims, 8 Drawing Sheets

Related U.S. Application Data division of application No. 16/609,406, filed as application No. PCT/US2017/031060 on May 4, 2017, now Pat. No. 11,484,839.

(56) References Cited

U.S. PATENT DOCUMENTS

| | | | |
|---|---|---|---|
| 3,219,573 | A | 11/1965 | Kwo-Wei et al. |
| 3,291,716 | A | 12/1966 | Vincent et al. |
| 3,412,006 | A | 11/1968 | Alexander et al. |
| 3,453,201 | A | 7/1969 | Mihara et al. |
| 4,217,200 | A | 8/1980 | Kedem et al. |
| 4,461,693 | A | 7/1984 | Jain |
| 4,752,373 | A | 6/1988 | Korngold |
| 5,891,328 | A | 4/1999 | Goldstein |
| 6,235,166 | B1 | 5/2001 | Towe et al. |
| 7,138,045 | B2 | 11/2006 | Sferrazza |
| 8,608,914 | B2 | 12/2013 | Shimamune et al. |
| 11,484,839 | B2 * | 11/2022 | Barber ................ B01D 61/50 |
| 2012/0152747 | A1 | 6/2012 | Eisaman |
| 2013/0105325 | A1 | 5/2013 | Sparrow et al. |
| 2014/0054173 | A1 | 2/2014 | Andersen |
| 2016/0310902 | A1 * | 10/2016 | Sawant ................ B01D 61/422 |

FOREIGN PATENT DOCUMENTS

| | | |
|---|---|---|
| CN | 103797636 A | 5/2014 |
| FR | 1268882 A | 8/1961 |
| JP | S4916189 B1 | 4/1974 |
| JP | S53022165 A | 3/1978 |
| JP | S541674 B2 | 1/1979 |
| JP | 2014014776 A | 1/2014 |

OTHER PUBLICATIONS

Japanese Patent Application No. 2019-560347, Office action dated Dec. 7, 2021.

Chinese Patent Application No. 201780092873.1, Office Action dated Jul. 16, 2021.

European Patent Application No. 17723871.4, Office Action dated Dec. 13, 2019.

Bobylev et al., "Methodical Approach for Selection of Design Parameters of Electrodialysis Diaphragmless Apparatus for Regeneration of Electrolyte-Containing Solution," Metallurgical & Mining Industry, 2013, vol. 5(2), pp. 77-80.

International Patent Application No. PCT/US2017/031060, International Search Report and Written Opinion dated Feb. 1, 2018.

International Patent Application No. PCT/US2017/031060, International Preliminary Report on Patentability dated Nov. 5, 2019.

Japanese Patent Application No. 2019-560347, Notice of Reasons for Rejection dated Mar. 23, 2021.

U.S. Appl. No. 16/609,406, Restriction Requirement dated Apr. 21, 2022.

U.S. Appl. No. 16/609,406, Notice of Allowance dated Jun. 29, 2022.

Canadian Patent Application No. 3,062,881, Office Action dated Dec. 20, 2022.

Canadian Patent Application No. 3,062,881, Office Action dated Jun. 15, 2023.

European Patent Application No. 17723871.4, Office Action dated Mar. 2, 2023.

European Patent Application No. 17723871.4, Office Action dated Feb. 7, 2025.

U.S. Appl. No. 17/955,445, Notice of Allowance dated Oct. 12, 2023.

* cited by examiner

ELECTRODIALYSIS STACK

CROSS-REFERENCE TO RELATED APPLICATIONS

This application is a divisional of U.S. application Ser. No. 17/955,445, filed, Sep. 28, 2022, which is a divisional of U.S. application Ser. No. 16/609,406, filed Oct. 29, 2019, which is a National Stage Entry of International Application No. PCT/US2017/031060, filed May 4, 2017.

FIELD

The present disclosure relates to electrodialysis stacks having at least one recessed electrode.

BACKGROUND

The following paragraphs are not an admission that anything discussed in them is prior art or part of the knowledge of persons skilled in the art.

In an electrodialysis stack having full electrodes, the ionic current is driven through the stack by a pair of electrodes (anode and cathode). The majority of the current passes through the ion transport membranes, creating desalination and concentration of salts. A portion of the current flows through the distribution manifolds through a shorting mechanism and reduces the device efficiency. This shorting current may be reduced by recessing an edge of an electrode so that it is separated from the manifold. Both edges of an electrode may be recessed. Both edges of both electrodes may be recessed.

INTRODUCTION

The following introduction is intended to introduce the reader to this specification but not to define any invention. One or more inventions may reside in a combination or sub-combination of the apparatus elements or method steps described below or in other parts of this document. The inventors do not waive or disclaim their rights to any invention or inventions disclosed in this specification merely by not describing such other invention or inventions in the claims.

Recessed electrodes may create a current distribution on the electrode that is not uniform and where there is a high current density on, or close to, the leading edge (nearest the manifold) of the electrode. Such a high current density may cause accelerated damage to both the electrode and the membrane in that area. Therefore, there remains a need for a modified electrodialysis stack that redistributes the current to reduce or eliminate damage to the electrode and/or to the membrane around the leading edge of the electrode. It is desirable if the modified electrolysis stack redistributes the current so that the leading edge current is within 150% of the bulk current density of the electrode.

One or more described examples attempt to address or ameliorate one or more shortcomings involved with electrodialysis stacks having a recessed electrode.

In some embodiments, the present disclosure provides an electrodialysis stack for treatment of an electrically conductive solution. The stack has two electrodes, ion-transport membranes, and electrodialysis stack spacers. The membranes and spacers are arranged between the electrodes to define electrodialysis cells, providing an electrically conductive fluid connection between the electrodes during electrodialysis. The membranes and spacers define apertures therein that, in combination, define a distribution manifold for the electrically conductive solution when the membranes and spacers are arranged to form the electrodialysis cells. At least one of the two electrodes has an edge recessed from the distribution manifold. The stack further includes an electrically insulated zone that overlaps with the electrically conductive fluid connection between the electrodes, where the electrically insulated zone extends substantially from the distribution manifold past the recessed edge of the recessed electrode, and extends substantially from the recessed electrode to the other electrode for a distance that is about 8% to 100% of the total distance between the two electrodes. The electrically insulated zone extends past the recessed edge of the recessed electrode to overlap with the electrode for about a distance determined by the equation:

$$\text{distance in cm} = (0.062 \text{ cm}^{-1}) * (\exp(-60/\text{total cp}) * (\text{area in cm}^2 \text{ of the manifold ducts of the concentrated stream at the recessed edge}),$$

where total cp refers to the total number of cell pairs in the stack.

In the context of the present disclosure, reference to the electrically insulated zone extending for "about" a distance should be understood to mean that the overlap distance may be +/−10% of the distance determined by the equation. For example, for a stack with 600 cell pairs and manifold ducts area of 40 cm², the overlap distance determined by the equation is 2.24 cm and a stack according to the present disclosure may have an electrically insulated zone that extends 2.24+/−0.22 cm past the recessed edge of the recessed electrode.

The electrically insulated zone may be formed by including a plurality of electrically insulating masks in the stack. The electrically insulating masks may include (a) a plastic sheet in an electrodialysis cell; (b) a plastic sheet between two adjacent electrodialysis cells; (c) an ion-transport resistant portion of a cation-transport membrane; (d) an ion-transport resistant portion of an anion-transport membrane; (e) a portion of a spacer that reduces the area on adjacent membranes available for the electrically conductive fluid connection; or (f) any combination thereof.

BRIEF DESCRIPTION OF THE DRAWINGS

Embodiments of the present disclosure will now be described, by way of example only, with reference to the attached Figures.

DETAILED DESCRIPTION

Generally, the present disclosure provides an electrodialysis stack that may be used for the treatment of an electrically conductive solution. The stack includes two electrodes, a plurality of ion-transport membranes and stack spacers. The membranes and spacers are arranged between the electrodes to define electrodialysis cell pairs that provide an electrically-conductive-fluid connection between the electrodes during electrolysis. In the electrodialysis stack, at least one of the electrodes is a recessed electrode. The stack includes an electrically insulated zone that extends (i) substantially from a distribution manifold past the recessed edge of the electrode and (ii) substantially from the recessed electrode to the opposite electrode for a distance that is about 8% to 100% of the total distance between the two electrodes. The distance that the electrically insulated zone extends past the recessed edge of the electrode may also be referred to as the overlap distance, and is based on physical parameters associated with the electrodialysis stack. The overlap distance is calculated as:

distance in cm=(0.062 cm$^{-1}$)*(exp(−60/total cp)*
(area in cm$^2$ of the manifold ducts of the concentrated stream at the recessed edge)+/−10%,
where total cp refers to the total number of cell pairs in the stack.

The electrically insulated zone is a region within the stack where the electrical resistance is greater than the bulk resistance of the stack. This increased electrical resistance redirects at least some of the current trying to move through the insulated zone into portions of the stack that are not electrically insulated. The electrically insulated zone redirects the current away from the edge of the recessed electrode and reduces or eliminates damage to the electrode and/or to the membrane around the leading edge of the electrode. In some examples, the modified electrolysis stack may redirect sufficient current so that the current density at the leading edge is within 150% of the bulk current density of the electrode.

In the context of the present disclosure, a "full electrode" should be understood to refer to an electrode that includes apertures that participate in the formation of at least one of the distribution manifolds. A "recessed electrode" should be understood to refer to an electrode that has a conductive portion whose leading edge is spaced apart from the apertures. A recessed electrode has a conductive portion that lacks apertures that participate in the formation of the main desalination and concentration distribution manifolds, but may include one or more manifolds specific to the electrode inlet and/or outlet streams.

The electrode may include a titanium plate coated with a noble metal (such as: platinum, iridium oxide, tantalum, ruthenium, or silver), or may include a capacitive carbon electrode coated on or bonded to a metal current collector (such as: Cu, Al, Ni, Fe, Co, Ti, or a mixture or alloy thereof).

Figure 1:
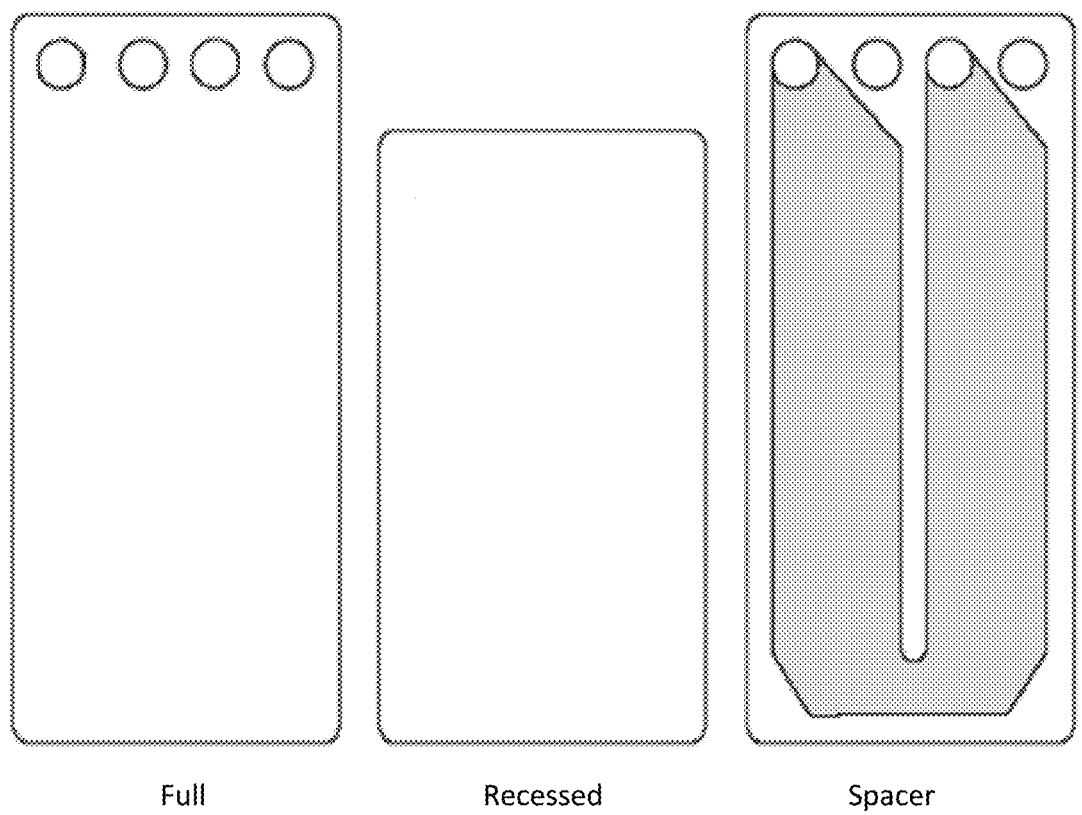
FIG. 1 is an illustration of a full electrode, a recessed electrode, and a spacer that may be used in an electrodialysis stack.

FIG. 1 illustrates an exemplary "full" electrode and an exemplary "recessed" electrode in the context of a spacer, where the shaded area of the spacer illustrates the fluid flow area. A spacer may also be referred to as a "flow spacer" since it separates two membranes and allows for the distribution of fluid across the surface of the membranes.

Both electrodes of the electrodialysis stack may be recessed from the same side of the stack, in which case there may be two distinct electrically insulated zones, each zone independently extending towards the opposite electrode for distances that are at least about 8% of the total distance between the two electrodes. The electrically insulated zones may meet, forming a single electrically insulated zone that extends from one of the recessed electrodes to the other recessed electrode.

The electrically insulated zone extends substantially from the distribution manifold past the leading edge of the recessed electrode. The expression "substantially from the distribution manifold" should be understood to mean that the electrically insulated zone is sized and shaped to sufficiently insulate the distribution manifold from the electrical current flowing perpendicular to the face of the distribution manifold to reduce or avoid electrical shorting through the flow channel of the manifold. In some examples, the electrically insulated zone extends from the manifold-side face of the electrolysis stack past the recessed edge of the electrode.

The electrically insulated zone extends substantially from the recessed electrode to the opposite electrode for a distance that is about 8% to 100% of the total distance between the two electrodes. In examples where the electrically insulated zone is defined by electrically insulating masks, it should be understood that the insulating masks do not need to be directly adjacent to the electrode. The insulating zone may be defined by masks that are a part of, or adjacent to, electrodialysis cell pairs that are a distance away from the electrode. The expression "extends substantially from the recessed electrode" should be understood to mean that the insulating masks are sufficiently close to the electrode to redistribute the current at the leading edge of the electrode. In some examples, the first insulating mask is located within, or is a part of, the first three electrolysis cell pairs adjacent to the recessed electrode. In some specific examples, the first insulating mask is a part of, or adjacent to, the first electrolysis cell pair adjacent to the recessed electrode.

The stack may include one or more additional electrically insulated zones. In stacks that include two recessed electrodes, the additional insulated zones may be located between the two insulated zones that extend from the two electrodes. Additional electrically insulated zones need not overlap with the recessed edge of an electrode. For example, a stack may include (1) a first electrically insulated zone that overlaps with the recessed edge of the first electrode and that extends 10% of the total distance between the two electrodes, (2) a second electrically insulated zone that extends to the recessed edge of the first electrode and that extends from the first insulated zone for a distance that is 20% of the total distance between the two electrodes, and (3) a third electrically insulated zone that does not extend past the recessed edge of the first electrode and that extends from the second insulated zone for a distance that is 20% of the total distance between the two electrodes. In such an exemplary stack, half of the distance between the two electrodes would include an electrically insulated zone.

The membranes and spacers define apertures therein that are aligned so that in combination, manifold channels are formed when the membranes and spacers are placed together to form the stack. The manifold channels distribute the concentrated feed (alternately called the brine stream) and the dilute feed (alternately called the feed or demineralized stream) to appropriate cells, and remove the dilute product and the concentrated brine product.

The spacer illustrated in FIG. 1 has two pairs of ports. In a stack, one pair of ports provides an inlet and outlet to the flow stream, while the other pair of ports completes internal conduits which will be used to support or remove fluid from adjacent spacers. The spacers adjacent to the illustrated spacer will be inverted relative to the spacer shown.

A plurality of manifold channels may be used to distribute the concentrated feed or the dilute feed. A plurality of manifold channels may be used to remove the dilute product or the concentrated product. The expression "area of the manifold ducts of the concentrated stream" should be understood to refer to the total cross-sectional area of the distribution manifold channel or channels for the concentrated stream inlet and outlet.

A cell pair may comprise a cation-exchange membrane, a dilute flow spacer, an anion-exchange membrane, and a concentrate flow spacer. In some exemplary electrodialysis stacks, cation-exchange membranes are alternated with anion-exchange membranes, and alternating dilute and concentrated streams are created. In other examples of electrodialysis or other stacks, there may be places in which two of the same membrane type are used in succession or the entire stack may have one type of membrane.

The flow spacer may have a thickness of about 0.01 cm to about 0.1 cm. The maximum stack height of a stack may be based on the maximum safe DC voltage that can be applied to a stack. A spacer having a thickness of about 0.08 cm may allow for a maximum stack height of about 750 cell pairs. Stacks according to the present disclosure may have from 10 to 2000 cell pairs, such as from 25 to 1000 cell pairs. In particular examples, stacks according to the present disclosure may have from 100 to 1000 cell pairs.

Figure 2:
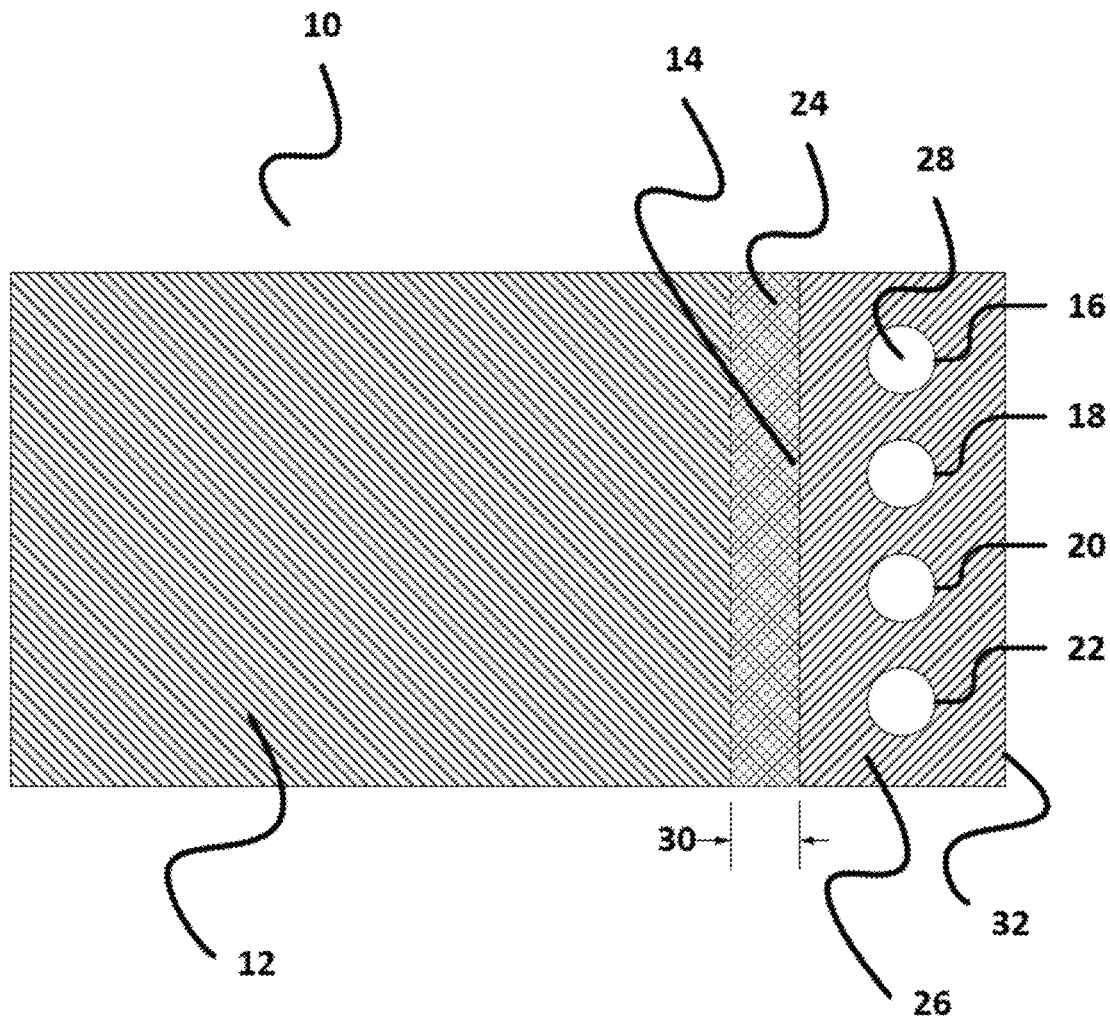
FIG. 2 is a top view of an exemplary electrodialysis stack according to the present disclosure.

FIG. 2 is a top-view of an illustration of an exemplary electrodialysis stack (10) depicting a recessed electrode (12) having a leading edge (14), and apertures (16, 18, 20, 22) that participate to form (i) a distribution manifold for the concentrated feed, (ii) a distribution manifold for the dilute feed, and (iii) production manifolds for the dilute product stream and the concentrated brine. The illustration depicts the overlap (24) of an electrically insulated zone (26) and the recessed electrode (12). In this exemplary stack, the aperture (16) corresponds to the aperture that participates to form the distribution manifold for the concentrated feed. Accordingly, it is the area (28) of that aperture that corresponds to the area of the manifold duct for the concentrated feed stream. The overlap distance (30) is calculated as discussed above. In this exemplary stack, the electrically insulated zone (26) extends from the manifold-side face (32) of the stack.

Figure 3:
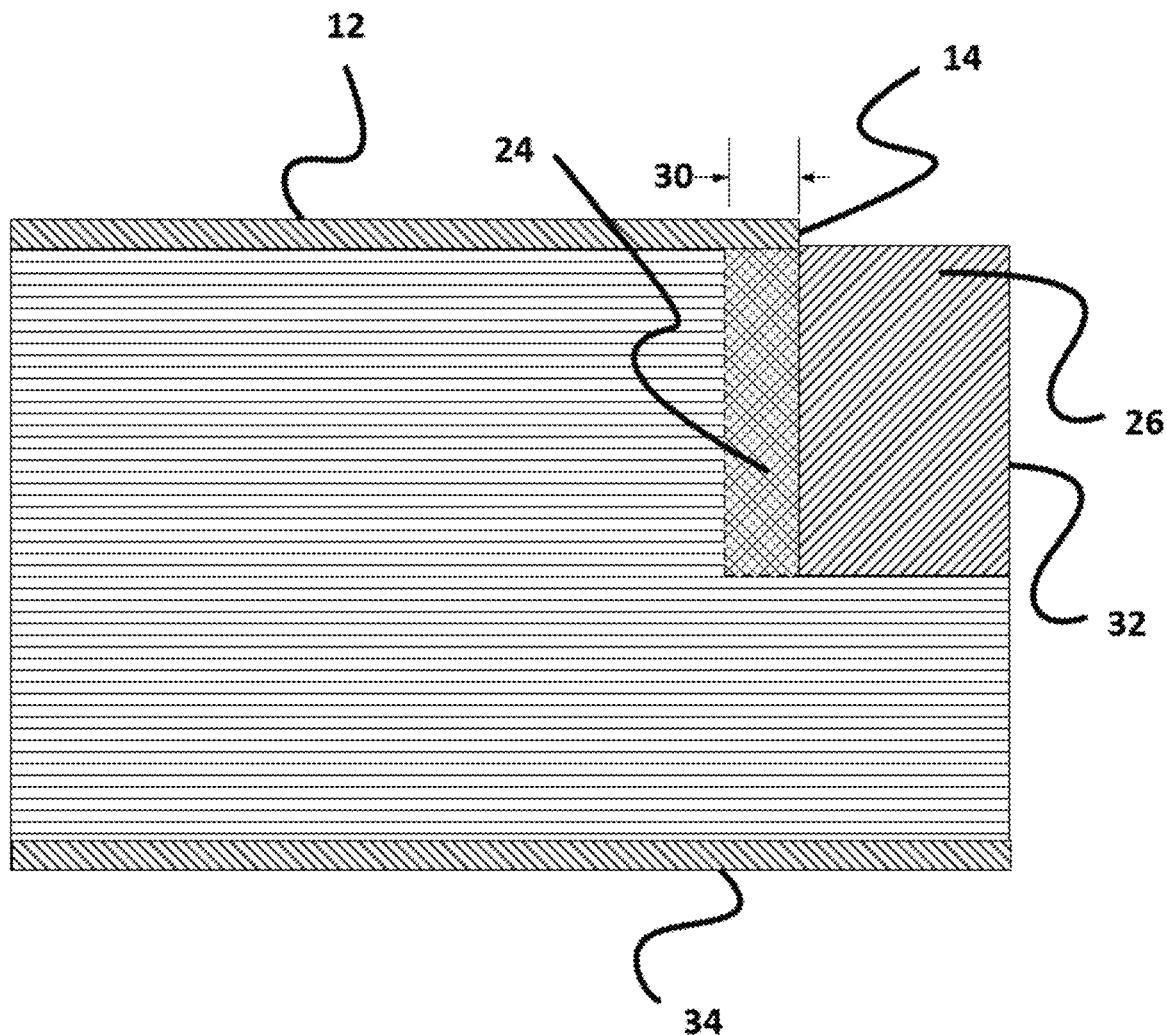
FIG. 3 is a side view of the exemplary electrodialysis stack illustrated in FIG. 2.

FIG. 3 is a side view of the exemplary electrodialysis stack of FIG. 2, depicting a plurality of electrolytic cells as horizontal lines, the electrically insulated zone (26) as extending from the recessed electrode (12) to the opposite electrode (34), for a distance of about 50% of the total distance. The opposite electrode (34) is a full electrode. The electrically insulated zone (26) extends from the manifold-side face (32) of the stack and overlaps with the recessed electrode (12) at the leading edge (14). For clarity, the overlap (24) refers to the portion of the electrically insulated zone that overlaps with the recessed electrode when viewed looking down at the recessed electrode. It should be understood that the electrically insulated zone refers to an electrically insulated region of the cells that make up the electrolytic stack.

Figure 4:
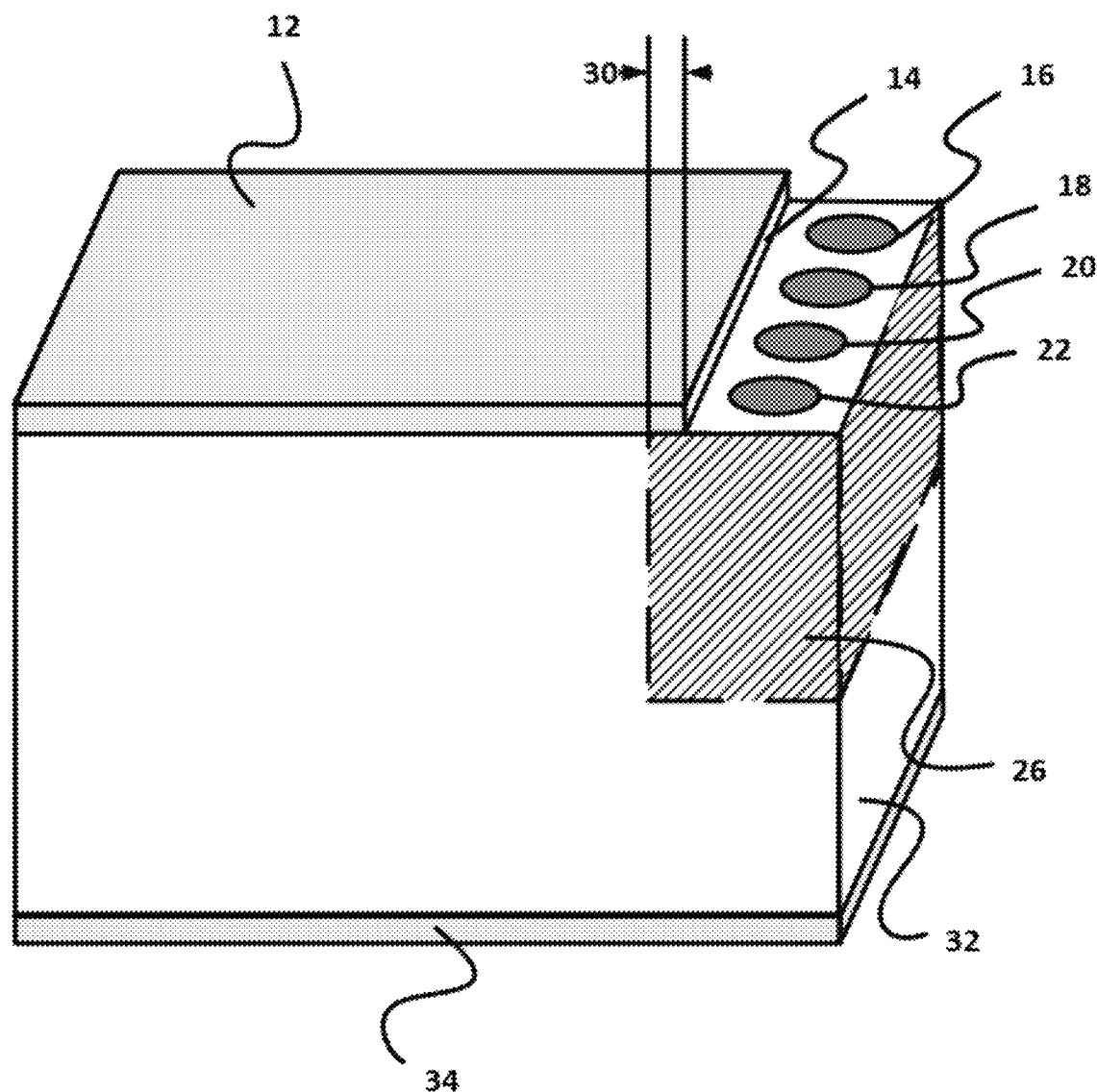
FIG. 4 is a three-quarter view of the exemplary electrodialysis stack illustrated in FIGS. 2 and 3.

FIG. 4 is an isometric view of the exemplary electrodialysis stack of FIGS. 1 to 3, but does not depict the electrolytic cells. The area denoted by the diagonal lines corresponds to the electrically insulated zone (26).

Figure 5:
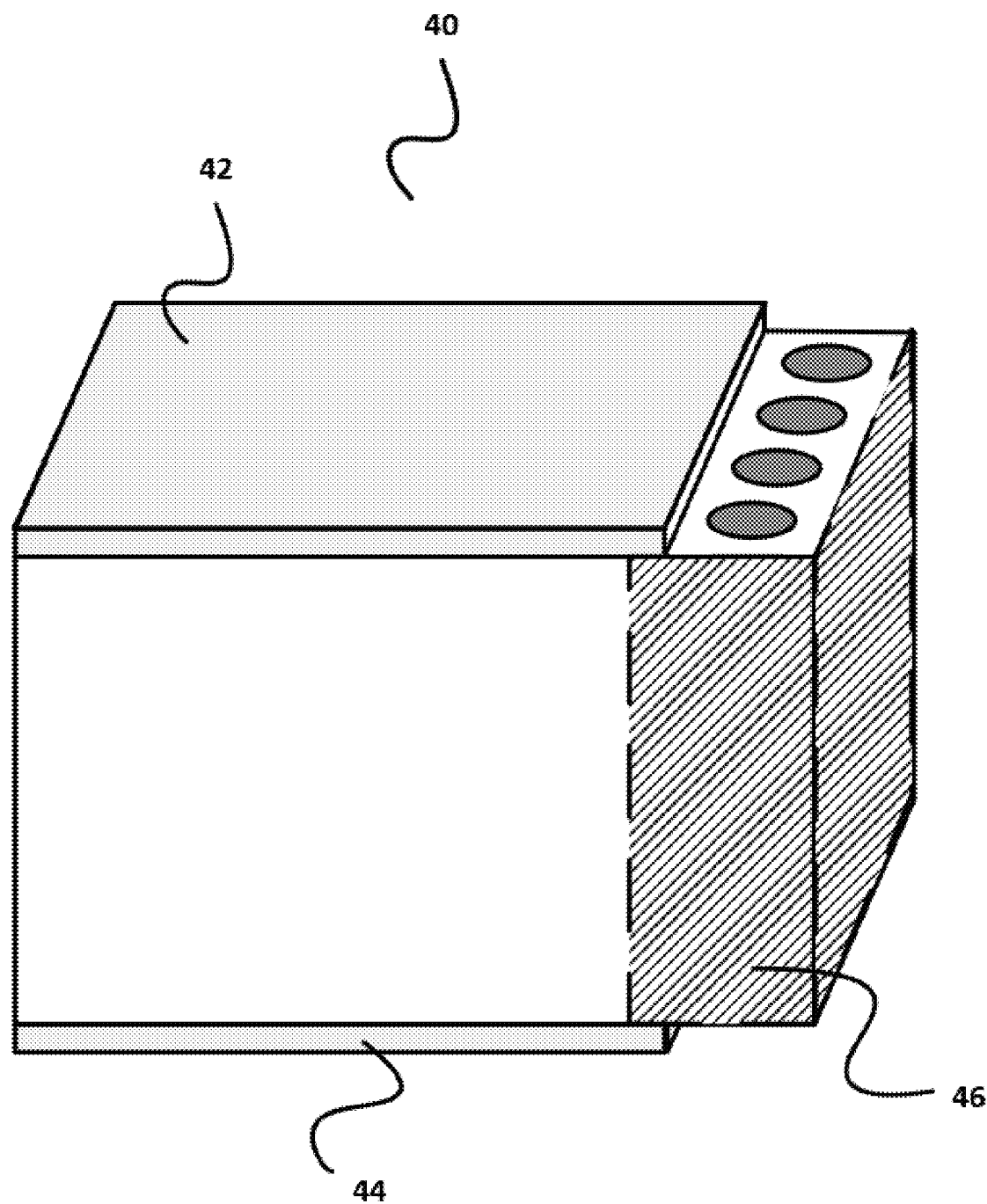
FIG. 5 is a three-quarter view of a second exemplary electrodialysis stack according to the present disclosure.

One specific example of an electrolysis stack according to the present disclosure is illustrated in FIG. 5. The stack (40) includes two electrodes (42 and 44) that are recessed on one side of the stack, and the electrically insulated zones for both recessed electrodes extend to form a single electrically insulated zone (46) that extends the full distance between the electrodes. The electrically insulated zones for the two recessed electrodes need not form a single insulated zone. The electrically insulated zone or zones may overlap with one electrode more than with the other electrode.

Figure 6:
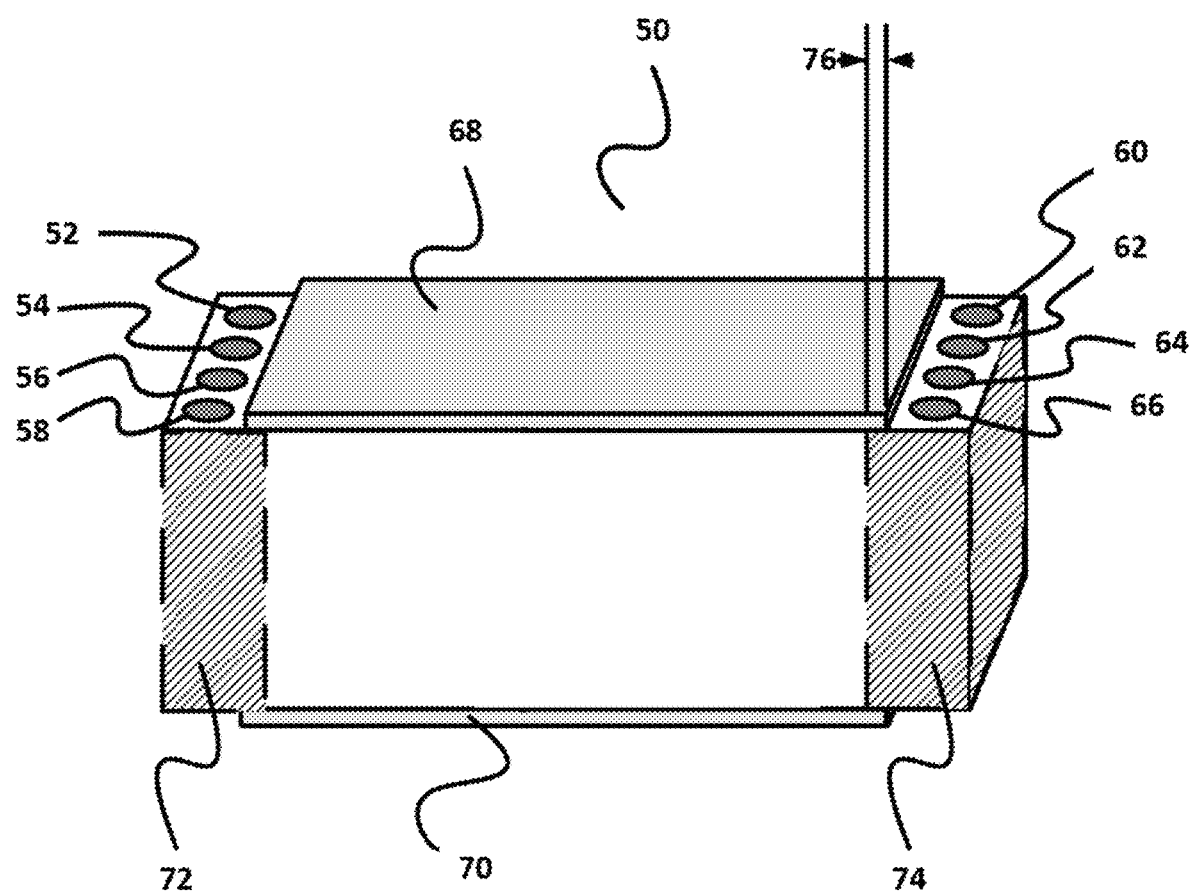
FIG. 6 is a three-quarter view of a third exemplary electrodialysis stack according to the present disclosure.

Another specific example of an electrolysis stack according to the present disclosure is illustrated in FIG. 6. The stack (50) includes cell pairs that define apertures that form manifolds on both sides of the stack. The manifolds on one side (52, 54, 56, 58) may be the inlet manifolds and the manifolds on the other side (60, 62, 64, 66) may be the waste manifolds. Both electrodes (68 and 70) are recessed on both sides of the stack, and the electrically insulated zones for both recessed electrodes extend to form two insulated zones (72, 74) that extend the full distance between the electrodes. The overlap distance (76) for one of the insulated zones with one end of the top recessed electrode (68) is illustrated. Parallel overlap distances for the other three insulated zones with the other ends of the electrodes are not shown. The overlap distances for each of the insulated zones are independently calculated based on the formula discussed above, with the concentrate duct area specific to each side being used in the calculation to determine the overlap at that side.

An electrically insulated zone may be formed by increasing the electrical resistance of a portion of the stack, such as by increasing the resistance of parts of a plurality of cell pairs. The increased electrical resistance is in comparison to the electrical resistance in the rest of the stack, such as the electrical resistance of cell pairs that are not a part of the insulated zone. In the context of the exemplary stack illustrated in FIGS. 2 and 3, the cell pairs in the top 50% of the stack have an increased electrical resistance around the manifold and overlapping with the recessed edge of the top electrode. In the remaining portion of the cell pairs in the top 50% of the stack, the electrical resistance is not increased.

The electrically insulated zone may be formed by including a plurality of electrically insulating masks in the stack. The insulating mask may be added to a cell pair, or be formed from one or more components of a cell pair.

An electrically insulating mask may be, for example: (a) a plastic sheet in an electrodialysis cell; (b) a plastic sheet between two adjacent electrodialysis cells; (c) an ion-transport resistant portion of a cation-exchange membrane; (d) an ion-transport resistant portion of an anion-exchange membrane; or (e) a portion of a spacer that reduces the area on adjacent membranes available for the electrically conductive fluid connection. The insulated zone may be formed using a plurality of similar types of insulating masks, such as using a plurality of plastic sheets; or using a combination of different types of insulating masks, such as a combination of both plastic sheets and ion-transport resistant portions of the ion-exchange membranes.

The electrically insulated zone may be defined, at least in part, by a plurality of plastic sheets that are each positioned between an ion-exchange membrane and an adjacent spacer. Because a cell pair includes a cation-exchange membrane, a dilute flow spacer, an anion-exchange membrane, and a concentrate flow spacer, and because the stack includes a plurality of cell pairs, each plastic sheet may be positioned:

between a cation-exchange membrane and a dilute flow spacer;
between a dilute flow spacer and an anion exchange membrane;
between an anion-exchange membrane and a concentrate flow spacer; or between a concentrate flow spacer and a cation-exchange membrane of an adjacent cell pair.

The plastic sheets in a stack do not need to all be placed in the same part of each cell pair. In an exemplary stack, the plurality of plastic sheets may be positioned on top of a plurality of cation-exchange membranes with one sheet per membrane. In another exemplary stack, some of the plastic sheets may be positioned between a cation-exchange membrane and a dilute flow spacer, while other plastic sheets may be positioned between an anion-exchange membrane and a concentrate flow spacer. In another exemplary stack, each cell pair would include a plastic sheet on both sides of each membrane.

A plastic sheet suitable to be used to form an electrically insulated zone may have an areal resistance greater than 100 ohm·cm², have a thickness less than 0.05 mm, be acid stable, be base stable, or any combination thereof. Plastic sheets that may be used may be sheets of polyethylene (PE), polypropylene (PP), polyvinylchloride (PVC), polyethylene terephthalate (PET), polyvinylidene difluoride (PVDF), or polytetrafluoroethylene (PTFE). The plastic sheets may define apertures that are aligned with the apertures of the membranes and spacers. The plastic sheet may be rectangular and sized so that an edge of the sheet aligns with the edge of the apertures. A plastic sheet may be bonded, such as thermally bonded, to a spacer.

The electrically insulated zone may be defined, at least in part, by a plurality of (a) ion-transport resistant portions of cation-exchange membranes, (b) ion-transport resistant portions of anion-exchange membranes, or (c) both.

An ion-transport resistant portion of an ion-exchange membrane may be a portion of the membrane that has, on average, substantially zero net bulk charge for the fixed ions. For example, a cation-exchange membrane may include fixed anionic charges that transport a dissolved cation across the membrane. The ion-transport resistant portion of the cation-exchange membrane may include substantially equal molar amounts of both fixed cationic and fixed anionic charges. The fixed cationic charges in the ion-transport resistant portion of the membrane interact with the dissolved cation and electrostatically reject its transport across the membrane. Similarly, the ion-transport resistant portion of an anion-exchange membrane may include substantially equal molar amounts of both fixed cationic and fixed anionic charges, while the remainder of the anion-exchange membrane includes fixed cationic charges.

An example of an anion-exchange membrane is a membrane formed from the polymerization of: dimethylaminopropyl methacrylamide (DMAPMA), cyclohexanedimethanol diglycidyl ether (CHDMDGE), HCl, and N-vinyl caprolactam (V-Cap) on a backing sheet. The ion-transport resistant portion of that membrane may be formed from that polymerization together with 2-acrylamido-2-methylpropane sulfonic acid (AMPS) in a molar amount that would result in a polymer having substantially equal amounts of fixed cationic and anionic charges. The resulting ion-transport resistant portion may have a resistivity that is about ten to about fifty times greater than the resistivity of the anion-exchange portion of the membrane.

Another example of an anion-exchange membrane is a membrane formed from the polymerization of: trimethylaminoethylmethacrylate chloride (TMAEMC) and ethylene glycol dimethacrylate (EGDM). The ion-transport resistant portion of that membrane may be formed from that polymerization together with 2-acrylamido-2-methylpropane sulfonic acid (AMPS) in a molar amount that would result in a polymer having substantially equal amounts of fixed cationic and anionic charges. The resulting ion-transport resistant portion may have a resistivity that is about 100 to about 500 times greater than the resistivity of the anion-exchange portion of the membrane.

An example of a cation-exchange membrane is a membrane formed from the polymerization of: 2-acrylamido-2-methylpropane sulfonic acid (AMPS) and EGDM. The ion-transport resistant portion of that membrane may be formed from that polymerization together with trimethylaminoethylmethacrylate chloride (TMAEMC) in a molar amount that would result in a polymer having substantially equal amounts of fixed cationic and anionic charges.

Alternatively, an ion-transport resistant portion may be a portion of the membrane that lacks fixed charges. For example, an anion-exchange membrane may include fixed cationic charges that transport a dissolved anion across the membrane, while the ion-transport resistant portion of the anion-exchange membrane may include only the polymerization products of uncharged monomers and crosslinkers. Similarly, a cation-exchange membrane may include fixed anionic charges that transport a dissolved cation across the membrane, while the ion-transport resistant portion of the cation-exchange membrane may include only the polymerization products of uncharged monomers and crosslinkers.

An example of such an anion-exchange membrane is a membrane formed from the polymerization of: trimethylaminoethylmethacrylate chloride (TMAEMC) and ethylene glycol dimethacrylate (EGDM), where the ion-transport resistant portion of that membrane is formed from the polymerization of N-vinyl caprolactam with EDGM as crosslinker.

Flow spacers provide structure within a flow area to define a flow path from an inlet to an outlet between two membranes. Flow spacers may include cross straps, which (a) give the spacer physical integrity, (b) support the adjacent membranes, (c) aid stack alignment during assembly, (d) promote turbulence which helps reduce colloidal deposition, or (e) a combination thereof. The electrically insulated zone may be defined, at least in part, by a plurality of spacers having portions of the spacers that reduce the area on adjacent membranes available for the electrically conductive fluid connection. The spacers may reduce the area available for the electrically conductive fluid connection by about 50% to about 75%.

For example, flow spacers according to the present disclosure may include structures that span the spacer to contact both membranes so as to reduce or prevent ion transport across the membranes in the contact area. The flow spacer includes the structures in areas that extend past the recessed edge of the recessed electrode to overlap with the electrode for a distance as discussed above.

Figure 7:
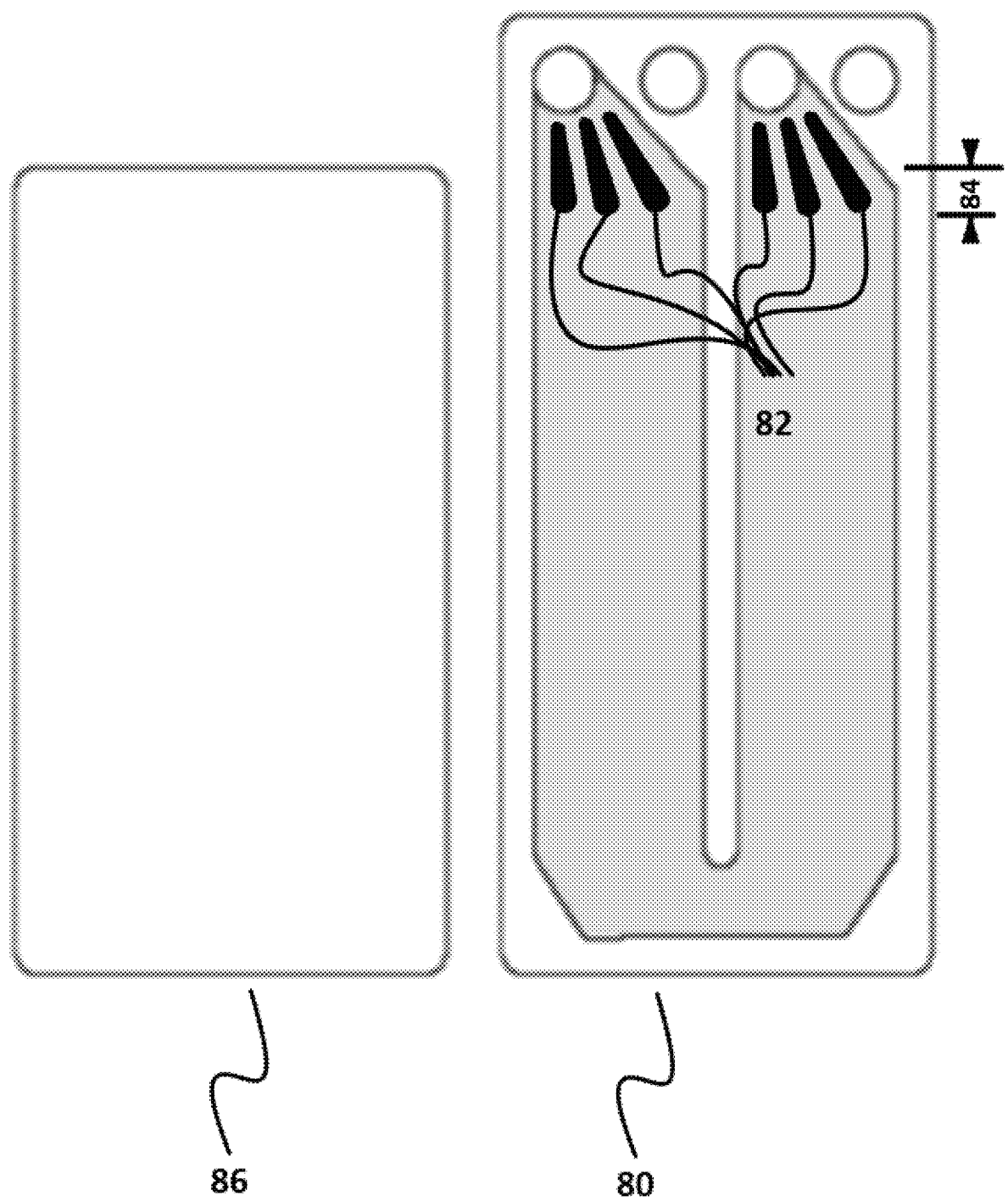
FIG. 7 is an illustration of a recessed electrode (left) side-by-side with an exemplary spacer according to the present disclosure.

FIG. 7 illustrates a particular example of such a flow spacer. The spacer (80) includes elongate structures (82) that extend from the manifold area in the direction of the fluid flow. The overlap distance (84) is illustrated in relation to the recessed electrode (86), shown adjacent to the flow spacer (80). The elongate structures (82) span the depth of the spacer so that they can contact the membranes on the top and bottom sides. Flow spacers illustrated in FIG. 7 may reduce pressure drop.

Figure 8:
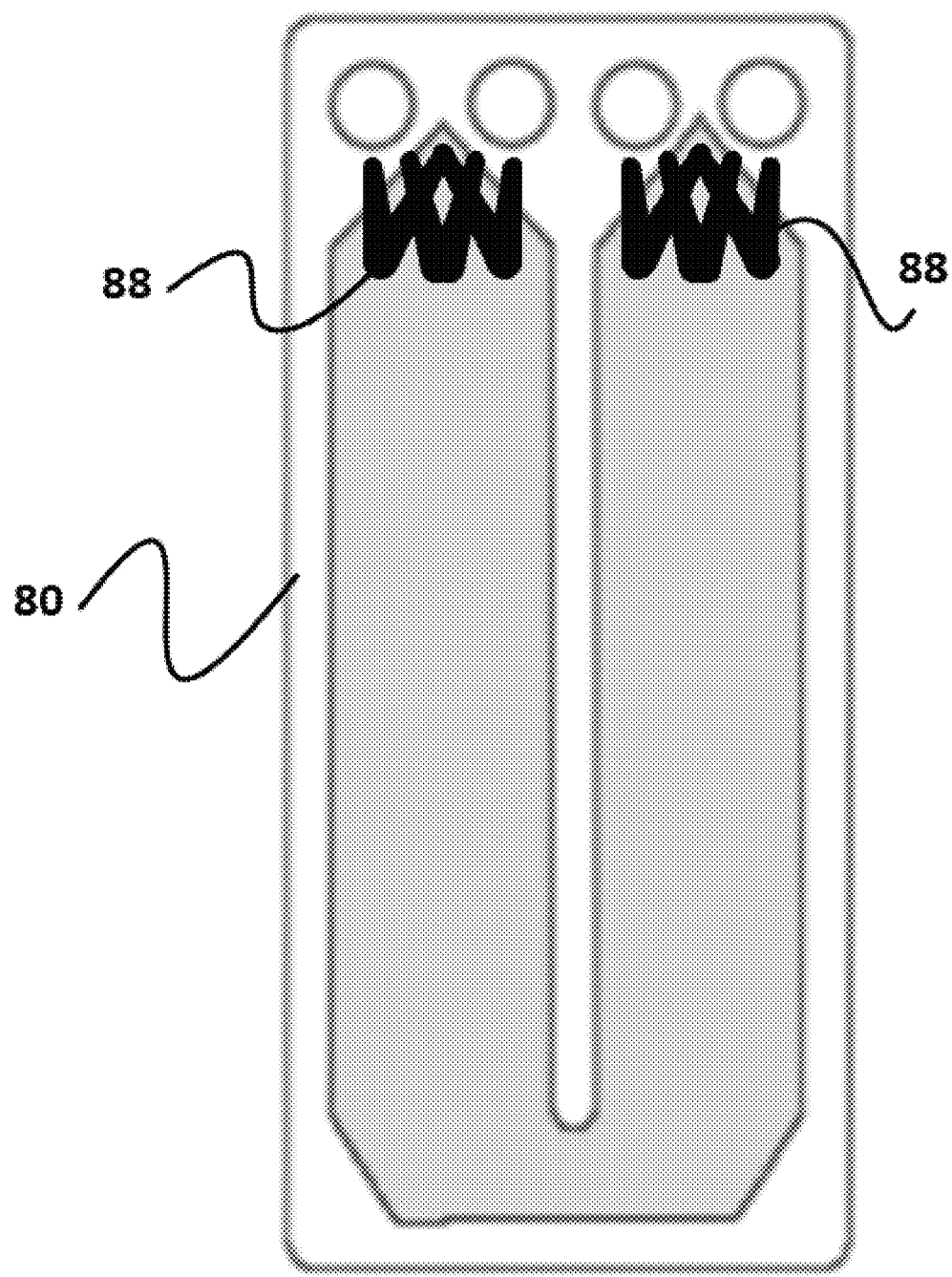
FIG. 8 is a top view of two stacked, but inverted, exemplary spacers illustrated in FIG. 7 where the shaded portion depicts the available ion-transport areas of a membrane that is sandwiched therebetween.

A similar but inverted spacer that is adjacent to the illustrated spacer will result in the elongate structures partially overlapping a membrane therebetween. FIG. 8 illustrates the reduced ion-transport areas (88) of a membrane that is sandwiched between two identical, but inverted, spacers. The reduced ion-transport areas (88) are areas of the membrane that contact an elongate structure of one or both of the spacers.

Although FIGS. 7 and 8 illustrate elongate structures, any shape may be used to reduce the area of an adjacent membrane that is available for ion transport. The expression "reduce the area" should be understood to mean that the area available for ion transport in a spacer according to the present disclosure is less than the corresponding area in an otherwise identical spacer that lacks the structure.

EXAMPLES

Example 1. Comparison of Current Density in Full Face and Recessed Electrodes

The current density of a full face segmented electrode in an electrolysis stack was measured in different segments. The stack included 600 cell pairs of cation-exchange and anion-exchange membranes. The stack was operated at 300 V, 15-23 A, 22° C., with a feed conductivity of about 3,000 µS/cm NaCl and a concentrate conductivity of about 17-25 mS/cm.

The current density was calculated using the exposed surface area and ranged from 6.4 to 9.7 mA/cm$^2$ in segments of the electrode that were not adjacent to the manifold. The current density of a recessed electrode in the same stack ranged from 6.8 to 9.9 mA/cm$^2$ in segments that were spaced apart from the recessed edge. In segments near the recessed edge of the electrode, the current density was ranged from 10.8 to 15.4 mA/cm$^2$. In the recessed electrode of this example, the segment defining the recessed edge of the electrode was half the length of the other segments.

In the preceding description, for purposes of explanation, numerous details are set forth in order to provide a thorough understanding of the examples. However, it will be apparent to one skilled in the art that these specific details are not required. Accordingly, what has been described is merely illustrative of the application of the described examples and numerous modifications and variations are possible in light of the above teachings.

Since the above description provides examples, it will be appreciated that modifications and variations can be effected to the particular examples by those of skill in the art. Accordingly, the scope of the claims should not be limited by the particular examples set forth herein, but should be construed in a manner consistent with the specification as a whole.

What is claimed is:

1. A spacer for positioning between adjacent membranes in an electrodialysis stack having an electrode with a recessed edge and a total number of electrodialysis cell pairs (total cp), the spacer defining apertures therein for forming a distribution manifold that includes manifold ducts of a concentrated stream when the spacer is a part of the electrodialysis stack, the spacer comprising:
   an impermeable membrane supporting area surrounding a flow field fluidly linking an inlet port and an outlet port;
   electrically resistant structures positioned in the flow field proximate the inlet and outlet ports, and having a thickness equal to the thickness of the membrane supporting area;
   wherein, when the spacer is positioned between the adjacent membranes in the electrodialysis stack:
   i) the electrically resistant structures contact each of the adjacent membranes to reduce the area on the adjacent membranes available for an electrically conductive fluid connection, and;
   (ii) the electrically resistant structures make up about 50% to about 75% of the surface area of the flow field from the inlet and outlet ports to a line spaced from the recessed edge of the electrode in a direction away from the inlet and outlet ports by an overlap distance that is about equal to:

(0.062 cm$^{-1}$)*(exp(−60/total cp)*(area in cm$^2$ of the manifold ducts of the concentrated stream at the recessed edge).

2. The spacer according to claim 1, wherein the electrically resistant structures are elongate and extend substantially along the flow path of the flow field.

3. The spacer according to claim 1 wherein the overlap distance is +/−10% of the distance determined by the equation (0.062 cm$^{-1}$)*(exp(−60/total cp)*(area in cm$^2$ of the manifold ducts of the concentrated stream at the recessed edge).

4. The spacer according to claim 1, wherein the flow field comprises cross straps.

5. An electrodialysis stack comprising:
   a first electrode and a second electrode spaced apart from the first electrode;
   a plurality of electrodialysis cell pairs (cp) arranged in a stack and positioned between the first and second electrodes to provide an electrically conductive fluid connection therebetween, each of the electrodialysis cell pairs including, in sequence, a first ion-exchange membrane, a first spacer, a second ion-exchange membrane, and a second spacer, wherein each of the first and second ion-exchange membranes and each of the first and second spacers have a plurality of apertures; and
   a distribution manifold including a plurality of manifold ducts, wherein each of the manifold ducts is formed by aligned ones of the plurality of apertures in each of the first and second ion-exchange membranes and each of the first and second spacers, wherein at least one of the plurality of manifold ducts is a concentrated stream inlet and at least one of the plurality of manifold ducts is a concentrated stream outlet,
   wherein at least one of the first and second electrodes is a recessed electrode having a recessed edge that is spaced apart from the distribution manifold,
   wherein each of the spacers comprises a plurality of electrically resistant structures that extend from the distribution manifold, past the recessed edge, and overlap with the recessed electrode for an overlap distance that is about equal to:

(0.062 cm$^{-1}$)*(exp(−60/total cp)*(area in cm$^2$ of the manifold ducts of the concentrated stream at the recessed edge), wherein each of the plurality of electrically resistant structures of the first spacer contact the first and second ion-exchange membranes and each of the plurality of electrically resistant structures of the second spacer contact the second ion-exchange membrane and the first spacer of an adjacent one of the electrodialysis cell pairs.

6. The electrodialysis stack according to claim 5, wherein each of the plurality of electrically resistant structures is elongate and extends from a first end proximate one of the plurality of apertures in the spacer to a second end spaced apart from the recessed edge by the overlap distance.

7. The electrodialysis stack according to claim 6, wherein the second spacer is identical to the first spacer but inverted relative to the first spacer.

8. The electrodialysis stack according to claim 6, wherein the first ion-exchange membrane is a cation-exchange membrane, and the second ion-exchange membrane is an anion-exchange membrane.

9. The electrodialysis stack according to claim 8, wherein one of the first and second spacers is a dilute flow spacer and the other of the first and second spacers is a concentrate flow spacer.

10. The electrodialysis stack according to claim 5, wherein each of the first and second ion-exchange membranes is a cation-exchange membrane.

11. The electrodialysis stack according to claim 5, wherein each of the first and second ion-exchange membranes is an anion-exchange membrane.

12. The electrodialysis stack according to claim 5, wherein each of the spacers comprises an impermeable membrane supporting area surrounding a flow field.

13. The electrodialysis stack according to claim 12, wherein each of the plurality of electrically resistant structures extend through the flow field and have a thickness equal to that of the membrane supporting area.

14. The electrodialysis stack according to claim 13, wherein the plurality of electrically resistant structures makes up about 50% to about 75% of the surface area of the flow field from the distribution manifold to a line spaced from the recessed edge of the recessed electrode by the overlap distance.

15. The electrodialysis stack according to claim 5 wherein the overlap distance is +/−10% of the distance determined by the equation $(0.062 \text{ cm}^{-1})*(\exp(-60/\text{total cp}))*(\text{area in cm}^2$ of the manifold ducts of the concentrated stream at the recessed edge).

16. The electrodialysis stack according to claim 5, wherein the flow field of each of the spacers comprises cross straps.

* * * * *